March 21, 1933.  H. C. CHRISTIANCE  1,902,761
HAY UNLOADING APPARATUS
Filed Dec. 31, 1930    2 Sheets-Sheet 1
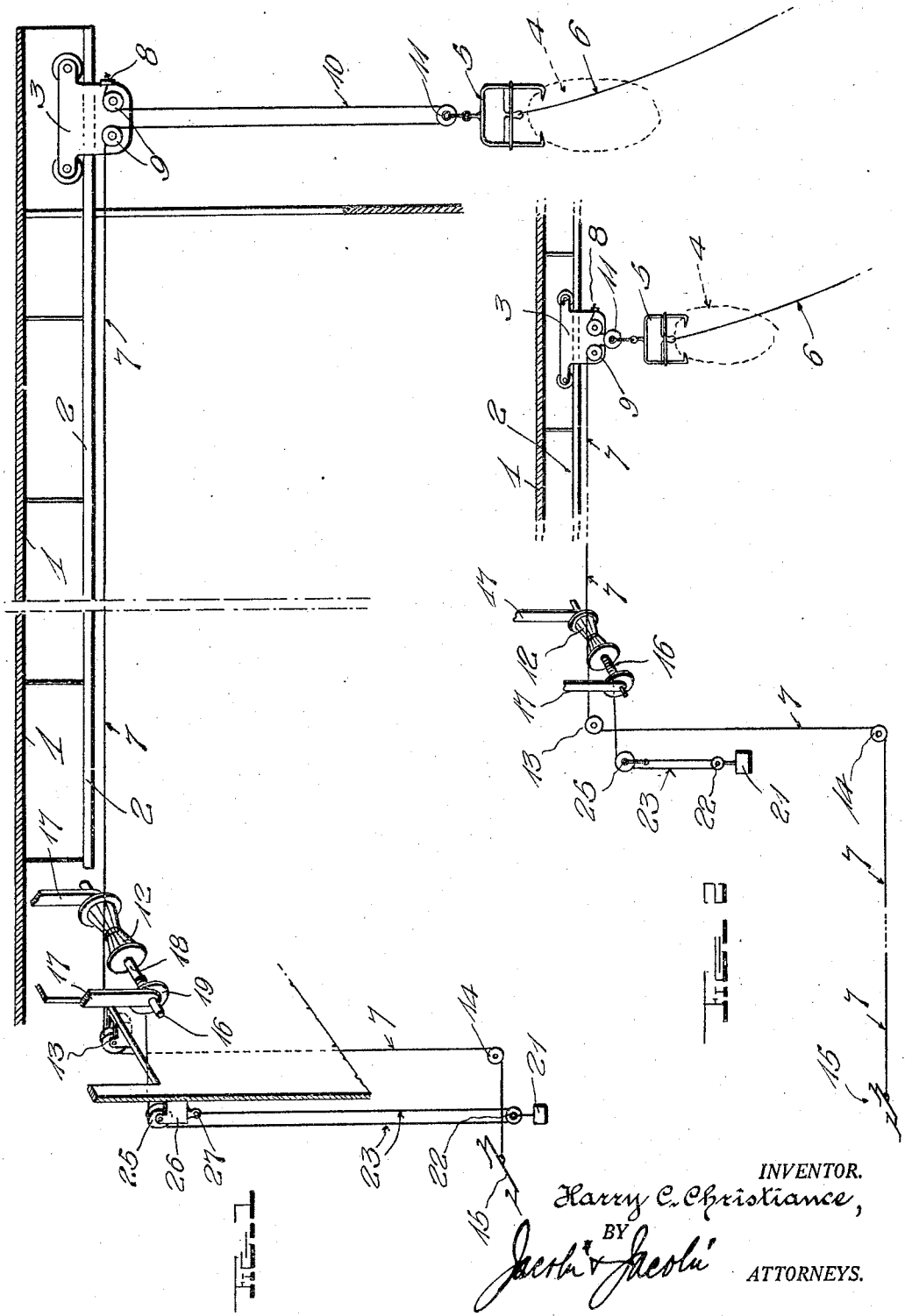
INVENTOR.
Harry C. Christiance,
BY
Jacobi & Jacobi  ATTORNEYS.

March 21, 1933.  H. C. CHRISTIANCE  1,902,761
HAY UNLOADING APPARATUS
Filed Dec. 31, 1930  2 Sheets-Sheet 2
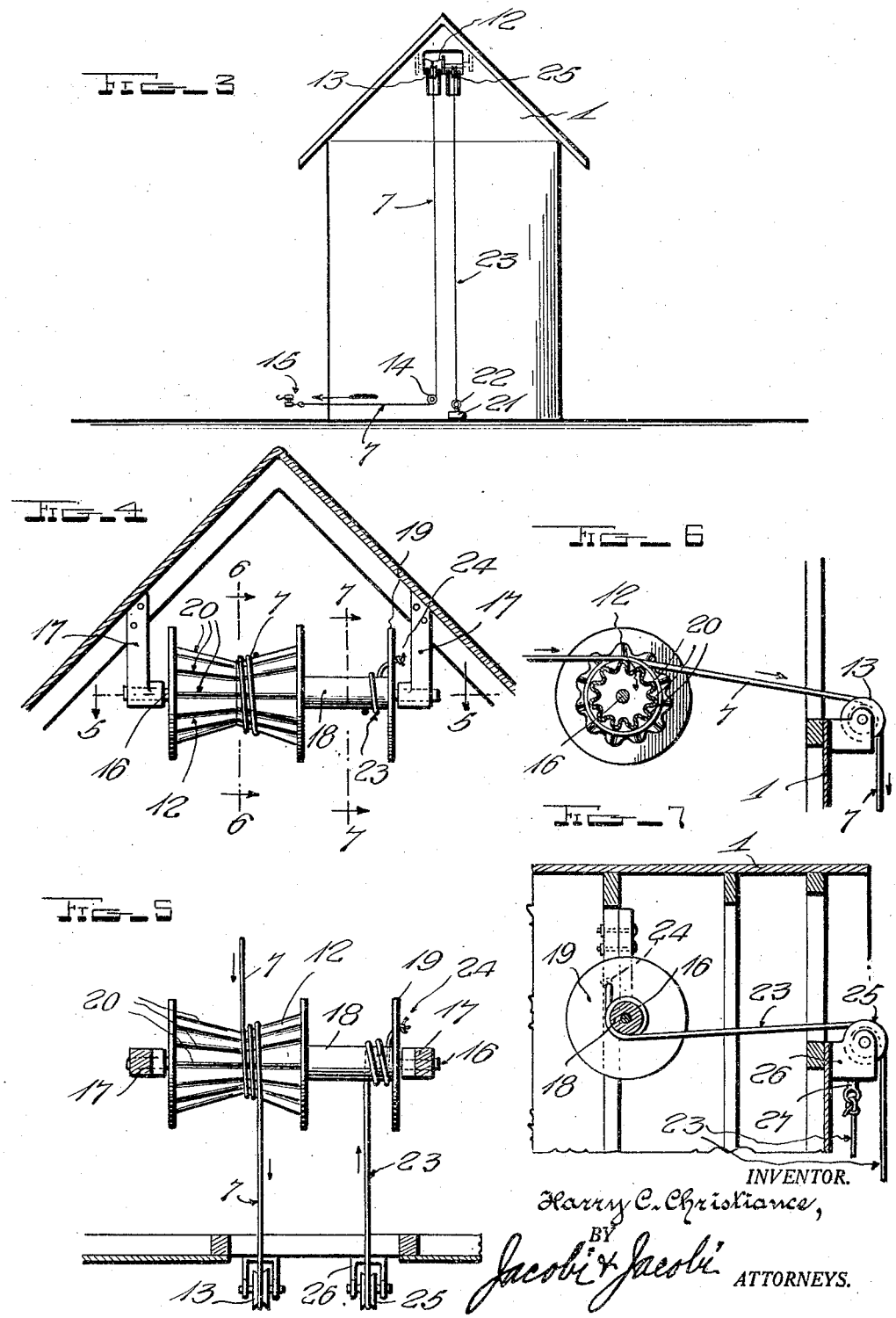

Patented Mar. 21, 1933

1,902,761

UNITED STATES PATENT OFFICE

HARRY C. CHRISTIANCE, OF COMPTON, ILLINOIS

HAY UNLOADING APPARATUS

Application filed December 31, 1930. Serial No. 505,926.

This invention relates to an unloading apparatus and more particularly to an apparatus adapted to be mounted in a barn and by means of which hay may be unloaded from a hay wagon and deposited in a hay mow.

One object of the invention is to provide an apparatus of this character including a carriage movable along an overhead track and having improved means for imparting movement to the carriage along a track from a position over a hay wagon to a position above the hay mow.

Another object of the invention is to provide an apparatus of this character including a tow rope for the carriage intended to be drawn by draft animals and engaged about a drum to be rotated as the rope moves.

Another object of the invention is to insure rotation of the drum as the rope moves and further yieldably resist rotation of the drum as the rope is drawn upon to move the carriage over the hay mow thereby assisting return movement of the carriage to a position over the hay wagon.

Another object of the invention is to cause a rope carrying a weight to effect reverse rotation of the drum to be wound upon the drum shaft as the carriage is moved along the track.

The invention is illustrated in the accompanying drawings wherein:—

Figure 1 is a diagrammatic perspective view of the unloading apparatus.

Figure 2 is a similar view showing the carriage moved to a position over a hay mow.

Figure 3 is a view showing the apparatus mounted in a barn.

Figure 4 is an enlarged view illustrating the drum and mounting means therefor.

Figure 5 is a top plan view of the drum and associated parts.

Figure 6 is a sectional view taken along the line 6—6 of Figure 4.

Figure 7 is a sectional view taken along the line 7—7 of Figure 4.

This improved hay unloading apparatus is intended to be erected in a barn or similar building 1 in which hay is to be stored and includes an overhead track 2 mounted in the barn in such position that a carriage 3 may travel along the track from a position over a hay wagon driven into the barn to a position over a hay mow and a load of hay 4 carried by a fork 5 dropped. The fork 5 is of a conventional construction and bar the usual trip rope 6 so that after it has been moved upwardly from the loading position shown in Figure 1 and engaged with the carriage for transportation to a position over the hay mow the load may be released and allowed to drop from the fork.

The tow rope 7 which is attached at one end to the carriage as shown at 8 and engaged with pulley wheels 9 of the carriage has a depending looped portion 10 engaged with the pulley wheel 11 so that the carriage may be lowered to a loading position and drawn upwardly into position to engage the carriage when pull is exerted upon the rope. The rope extends longitudinally of the track 2 and after being wrapped about the drum 12 is engaged with a pulley 13 secured to the barn and then extended downwardly and engaged about a pulley 14. A draft appliance 15 is secured to the rope 7 and when draft animals hitched to the draft appliance exert pull upon the rope the fork will be drawn upwardly to the carriage and the fork and carriage then moved along the track to a position over the hay mow. The trip rope can then be pulled to release the hay from the fork and the hay will drop into the mow.

The drum 12 is fast upon a shaft 16 rotatably mounted in bearing brackets 17 carried by the barn and at one side of the drum is disposed a sleeve or spool 18 which rotates with the drum and shaft and has a head 19 at one end. The drum is tapered from its ends as shown in Figures 4 and 5 so that the rope has a tendency to remain in the central portion of the drum and formed with longitudinally extending corrugations 20 as shown in Figure 6 so that rotation of the drum and spool will be assured when the rope 7 is drawn upon to raise the fork and move the carriage along the track to a position above the hay mow.

In order to assist rotation of the drum in a reverse direction there is provided a weight 21 having a pulley wheel 22 engaged by the depending looped portion of a rope 23. This rope has one end portion wrapped about the spool and secured to the head 19 as shown at 24 and is engaged with the pulley wheel 25 and then extended downwardly and upwardly to form the loop engaging the pulley wheel 22 and secured to the mounting brackets 26 for the pulley wheel 25 as shown at 27 in Figures 1 and 7. By this arrangement the rope 23 will be wound upon the spool 18 as the carriage is moved towards the dumping position, and the weight lifted. After the hay has been dropped the draft animals are driven towards the barn and as the rope 7 is slackened pull of the weight will rotate the spool and drum in a reverse direction and reel the rope 7 inwardly so that the carriage may be easily returned to the loading position over the hay wagon by a pull rope (not shown) or any other desired means and the fork drop to the lowered position shown in Figure 1.

From the foregoing description of the construction of my improved apparatus the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described the invention what I claim is:

Unloading apparatus comprising an overhead track, a carriage movable along said track from a loading position to an unloading position, a grapple, a tow rope extending longitudinally of said track and having one end secured to the carriage and a portion extending downwardly from the carriage and trained about a pulley wheel carried by the grapple whereby movement of the grapple towards and away from the carriage may be controlled, hangers at opposite sides of said track adjacent one end thereof, a shaft rotatably supported by said hangers and extending transversely beneath the track, a drum carried by said shaft, said rope having a portion wound about the drum to cause the drum and shaft to rotate when the rope is drawn upon to move the carriage along said track and the rope extending outwardly from the drum for engagement by draft means, said drum being corrugated longitudinally to create frictional binding between the drum and rope and cause the drum to rotate when the rope is drawn upon, and means to yieldably resist rotation of the drum and shaft in one direction consisting of a cable having one end wound upon said shaft and its intermediate portion engaged with a guide pulley, said cable extending downwardly from the guide pulley and then upwardly and secured to form a depending loop, and a weight having a suspending pulley engaged with the depending looped portion of the cable to exert pull upon the cable and resist rotation of the shaft and drum in one direction.

In testimony whereof I affix my signature.

HARRY C. CHRISTIANCE.